United States Patent
Suwito et al.

(10) Patent No.: US 6,724,568 B1
(45) Date of Patent: Apr. 20, 2004

(54) DISK CLAMP FOR DISK DRIVE

(75) Inventors: Wantjinarjo Suwito, Longmont, CO (US); James D. Fahey, Farmington, CA (US)

(73) Assignee: Maxtor Corporation, Longmont, CO (US)

(*) Notice: Subject to any disclaimer, the term of this patent is extended or adjusted under 35 U.S.C. 154(b) by 130 days.

(21) Appl. No.: 09/864,531

(22) Filed: May 23, 2001

Related U.S. Application Data

(60) Provisional application No. 60/217,996, filed on Jul. 13, 2000.

(51) Int. Cl.[7] .................................................. G11B 17/02
(52) U.S. Cl. .................................................. 360/99.12
(58) Field of Search ......................... 360/99.12, 99.05, 360/98.08

(56) References Cited

U.S. PATENT DOCUMENTS

| | | | | |
|---|---|---|---|---|
| 4,796,141 A | * | 1/1989 | Tsumura .................... | 360/135 |
| 5,274,517 A | | 12/1993 | Chen ........................ | 360/98.08 |
| 5,333,080 A | | 7/1994 | Ridinger et al. ........... | 360/99.12 |
| 5,490,024 A | | 2/1996 | Briggs et al. ............. | 360/99.12 |
| 5,517,376 A | | 5/1996 | Green ....................... | 360/98.08 |
| 5,528,434 A | | 6/1996 | Bronshvatch et al. ..... | 360/98.08 |
| 5,777,832 A | | 7/1998 | Yi et al. .................... | 360/135 |
| 5,790,345 A | | 8/1998 | Alt ........................... | 360/98.08 |
| 5,790,346 A | | 8/1998 | Fletcher .................... | 360/99.12 |
| 5,838,516 A | | 11/1998 | Staggers et al. .......... | 360/98.08 |
| 5,875,171 A | | 2/1999 | Albrecht et al. ........... | 369/281 |
| 5,880,906 A | | 3/1999 | Lindrose ................... | 360/98.08 |
| 5,940,244 A | * | 8/1999 | Canlas et al. ............. | 360/98.08 |
| 6,212,030 B1 | * | 4/2001 | Koriyama et al. ........ | 360/98.08 |

OTHER PUBLICATIONS

Engineering drawing entitled "Maxtor Clamp, Disk, Big Hole," dated Oct. 1, 1995.
Engineering drawing entitled "Maxtor Disk Clamp, Alum, Lightning," dated Jan. 10, 1998.

* cited by examiner

*Primary Examiner*—Robert S. Tupper
(74) *Attorney, Agent, or Firm*—Sheridan Ross P.C.

(57) ABSTRACT

A clamp for securing data storage disks to a hub of a disk drive mechanism includes a flat body with a protuberance that defines a flat distal surface for engaging a data storage disk. The body also includes bores that receive members for securing the clamp to the hub and at least one groove for distributing the securing force of the securing members.

48 Claims, 2 Drawing Sheets

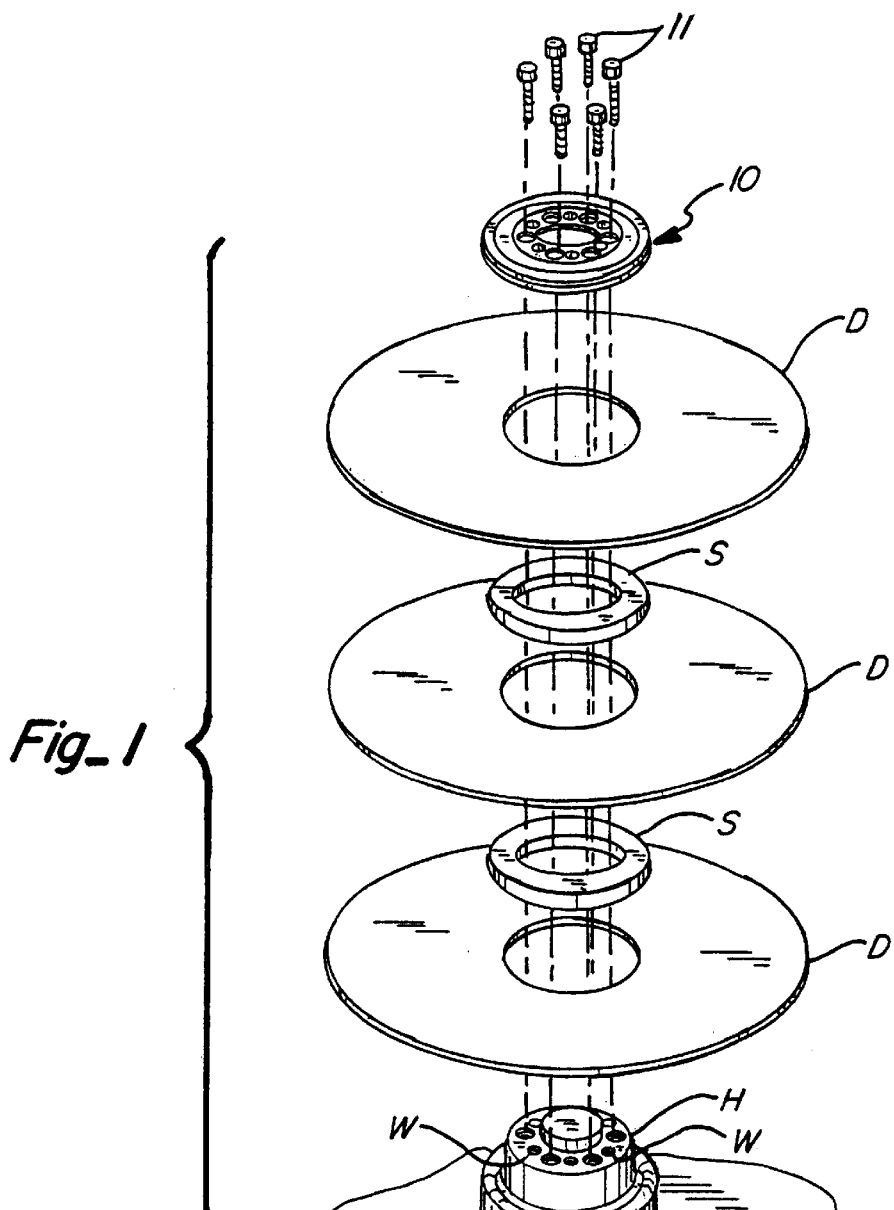
Fig_1
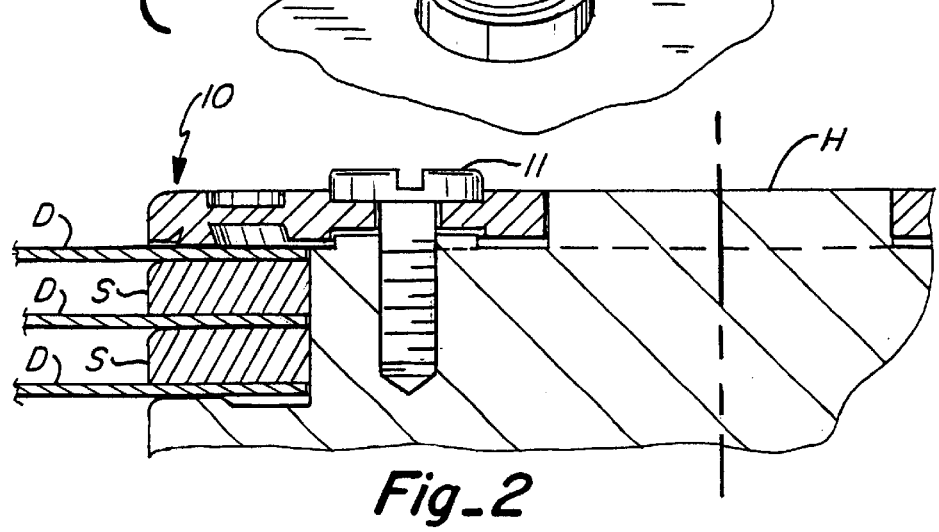
Fig_2

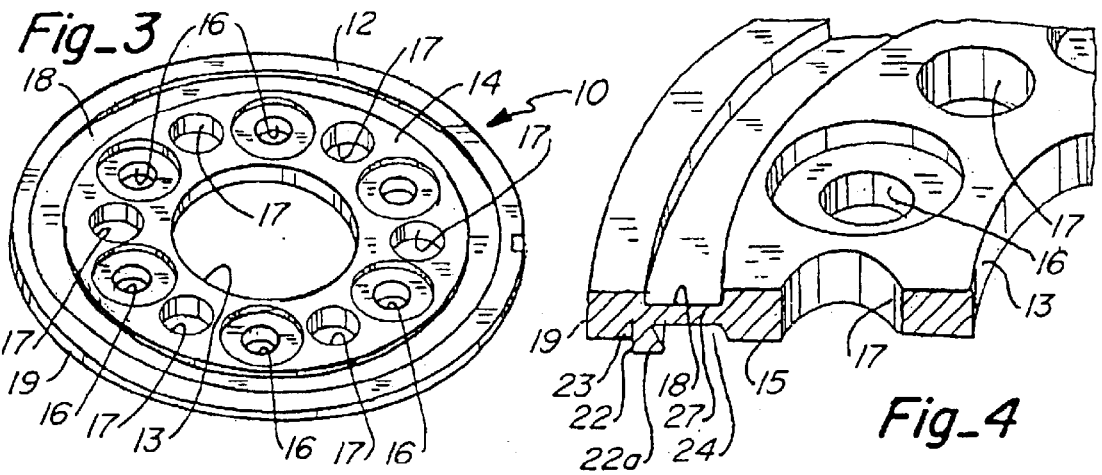
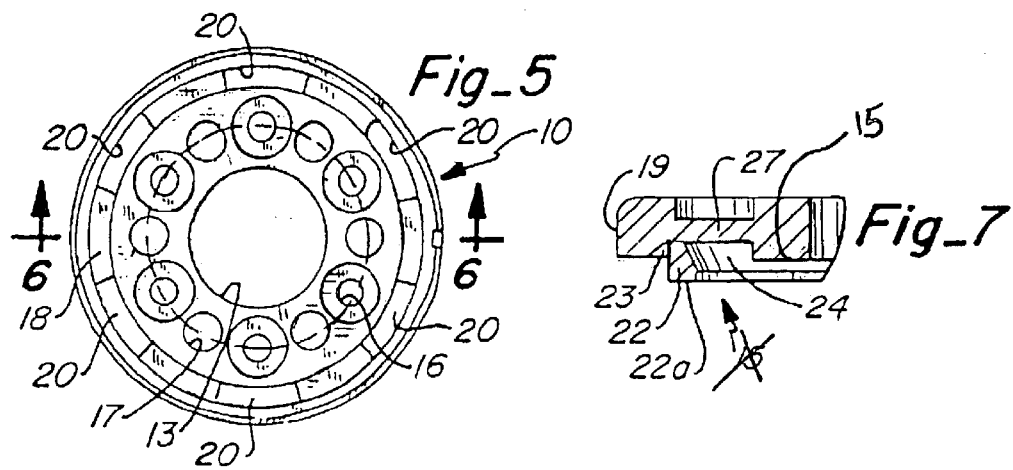
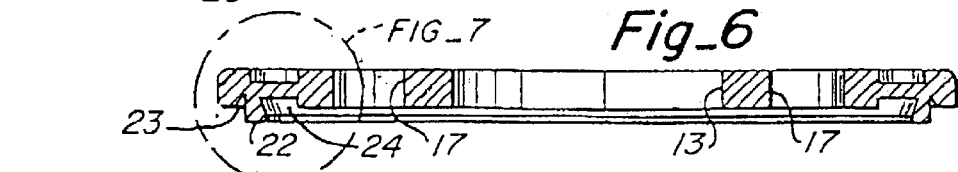
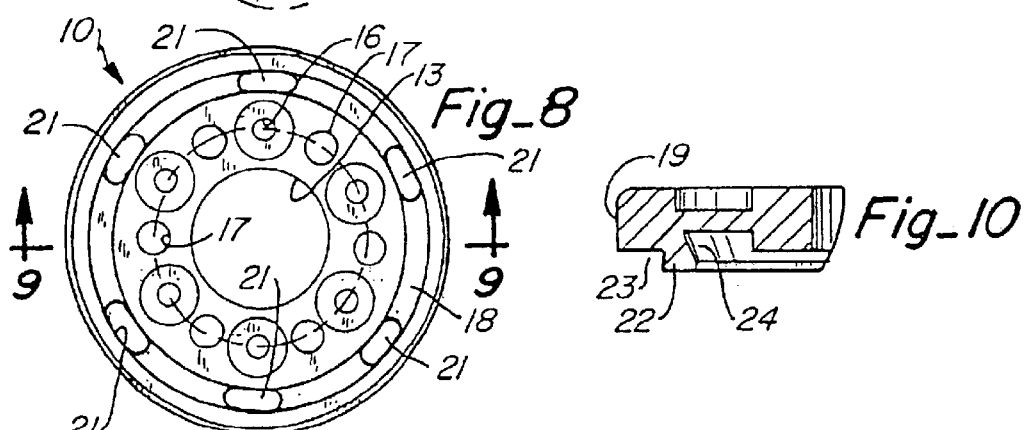
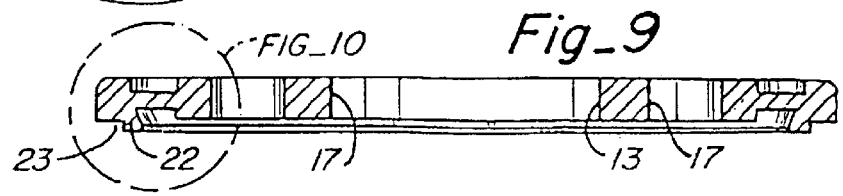

DISK CLAMP FOR DISK DRIVE

CROSS REFERENCE TO RELATED APPLICATIONS

Priority is claimed from U.S. Provisional Patent Application No. 60/217,996, filed on Jul. 13, 2000 and entitled "DISK CLAMP", the disclosure of which is incorporated herein by reference in its entirety.

FIELD OF THE INVENTION

The present invention relates to computer disk drives and, more particularly, to a disk clamp for a disk drive.

BACKGROUND OF THE INVENTION

Disk drive data storage systems typically include one or more data storage disks and a spindle motor for rotating the disks. The spindle motor lies within a rotatable spindle hub that supports the disks, and a clamp secures the disks to the hub.

Data storage disks have a central bore that receives the spindle motor hub. A typical disk clamp includes a disk-shaped body and a number of screws that secure the body and the disks to the hub. Tightening of the screws forces the clamp body against the uppermost disk, of a disk stack, and the clamp body against the hub, coupling the disks and intervening spaces to the hub so that the disks and the hub rotate together.

Some prior art disk clamps include a disk contact surface that is rounded. During operation of the disk drive, the rounded contact points compress or "dig" into an adjacent disk or spacer. This compressive force is transmitted radially outward on the disk and the radial force can distort or deform the disk from a normally planar shape into a cone-like or warped shape. This deformation makes it much more difficult to read data from the disk or write data on it. Specific examples of some prior art clamps include the U.S. Pat. Nos. 5,838,516; 5,875,171; 5,777,832; 5,880,906; 5,274,517; 5,490,024; 5,528,434; and 5,790,346. Although each of these prior art clamps may have specific constructions and improvements, one common structural characteristic is that each incorporates a curved or rounded surface which comes into contact with a disk or spacer mounted over the hub of a disk drive.

Other references disclosing disk clamps or related components include the U.S. Pat. Nos. 5,790,345; 5,517,376; and 5,333,080.

The clamp of the present invention avoids many of the disadvantages of the prior art clamps. The clamp of this invention provides a flat contact surface, reducing the radially directed force which results in disk deformation. The invention also provides undercuts adjacent the disk contact surface, further reducing the deformation causing loads. The clamp of the present invention provides a simple construction that minimizes the cost of fabrication and assembly and yet still provides effective and reliable operation.

SUMMARY OF THE INVENTION

In accordance with a preferred embodiment of the present invention, a disk clamp is provided that secures one or more data storage disks to a hub. The clamp includes a generally flat body having top and bottom faces and a center bore through which a portion of the hub extends. The body also defines on its bottom face a protuberance and a pair of grooves positioned on opposite radial sides of the protuberance. This protuberance has a flat distal surface for engaging a data storage disk. The body includes one or more securing bores for receiving securing members such as screws, and also includes access bores which provide access to bores formed on the hub which receive weights that balance the clamp, disks and spacers during rotation. The securing and access bores extend through the body and are geometrically arranged around the center bore. The body also has one or more arcuate grooves formed on its top face, proximate the securing bore or bores for distributing the securing force generated by the securing members extending through the corresponding securing bores. The portion of the body defined between opposing grooves on the top and bottom faces can also be collectively referred to as a web portion of the clamp.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is an exploded perspective view of a hub and disk assembly including a disk clamp of the present invention;

FIG. 2 is a fragmentary sectional view of the assembly of FIG. 1;

FIG. 3 is a perspective view of the clamp of the present invention;

FIG. 4 is an enlarged fragmentary perspective view of the clamp of FIG. 3 with a portion cut away to show the cross-sectional configuration of the clamp;

FIG. 5 is a top plan view of a modified clamp of the present invention;

FIG. 6 is a sectional view taken along line 6—6 in FIG. 5;

FIG. 7 is an enlarged sectional view of the encircled detail in FIG. 6;

FIG. 8 is a top plan view of a second modification of the clamp of the present invention;

FIG. 9 is a sectional view taken along line 9—9 in FIG. 8; and

FIG. 10 is an enlarged sectional view of the encircled detail in FIG. 9.

While the following disclosure describes the invention in connection with one embodiment and a number of modifications to that embodiment, one should understand that the invention is not limited to this embodiment or its modifications. Furthermore, one should understand that the drawings are not to scale and that graphic symbols, diagrammatic representations, and fragmentary views, in part, may illustrate the embodiment.

DETAILED DESCRIPTION OF THE DRAWINGS

Turning now to the drawings and referring specifically to FIG. 1, a disk drive disk and hub assembly generally includes data storage disks D, a spindle motor hub H, spacers S disposed between adjacent disks D, and the clamp of the present invention 10. The disks D have a central bore through which the spindle motor hub H extends. The spacers S lie between adjacent disks D to space them a predetermined distance apart; and the clamp 10 along with six screws 11 secure the stack of disks D and spacers S to the hub H, as shown in FIG. 2. The screws are tightened to drive the clamp 10 against the uppermost disk which, in turn, compresses the disks D and spacers S against the hub H thus coupling the disks to the hub so that the disks and the hub rotate together.

The clamp 10 includes a flat disk-shaped body 12 which is a one-piece integrally formed unit made of a cast material such as an aluminum alloy (e.g., an aluminum 6061-T6 alloy) or any other suitable material. Now referring to FIGS. 3 and 4, the body 12 has a central bore 13, a top face 14 and a bottom face 15. The body 12 also defines securing bores 16 through which the securing screws 11 extend. Access bores 17 are provided as access holes so weights (not shown) can be placed within the weight receiving bores W on the hub H. The disk drive is balanced by placing the selected weights in the respective bores W on hub H. The securing bores 16 and the access bores 17 have centers that lie spaced apart on substantially the same circumference, a predetermined radial distance from the center of the central bore 13. Preferably, the access bores 17 are placed between securing bores 16 in a manner to provide flexibility to achieve uniform and balanced distribution of weight. The securing bores 16 may be countersunk to accommodate the head of a securing member 11, and to provide a sufficient clearance between the screw heads and the disk drive top cover (not shown).

The clamp 10 further defines a first, circular groove 18 on the top face 14 of the body 12 in the space between the bores 16 and 17 and the circumferential edge 19 of the body. The groove 18 may have a constant shape and depth as shown in FIGS. 3 and 4, or it may vary in depth (See FIGS. 5 and 8) to distribute the loading of the screws 11. For example, FIG. 5 shows a modification of the clamp 10, including arcuate pockets 20. These pockets 20 are areas on groove 18 which extend deeper into the body 12. Each of the pockets 20 lie proximate a securing bore 16, which helps to distribute the loading of the screws 11 that are placed in the bores because the material removed by the pockets directs some of the load toward regions in between the screw positions on edge 19 and annular protuberance 22. FIG. 8 shows another modification of the clamp 10, including pockets 21 that are smaller in length than those of FIG. 5. A number of other arrangements can be utilized with respect to providing pockets and/or grooves along a perimeter portion of the disk clamp. For example, a series of pockets like pockets 21 may be utilized without the existence of a continuous circumferential groove 18. Groove 24 could also include a series of pockets formed thereon. A sinusoidal shaped groove could be used in lieu of the uniform depth of grooves 18 and 24. The deeper portions of the sinusoidal groove would be placed adjacent screws 11 to evenly distribute the clamp load.

Referring to FIG. 3, the bottom face 15 of the clamp 10 is generally flat with the annular protuberance 22 that lies proximate the edge 19 of the body 12, and spaced a predetermined distance inwardly of the edge 19. This protuberance 22 has a generally trapezoidal cross section having a flat, exposed surface 22a for contacting a disk. This contact surface 22a minimizes radial loading which can cause deformation of the disks D. The flat surface 22a avoids the digging action generated in conventional clamp arrangements.

The bottom face 15 has other features to include circumferential grooves 23 and 24 that lie on opposite sides of the protuberance 22. These grooves 23 and 24 may have an irregular shape such as the shape of groove 23 in FIG. 4, a trapezoidal shape like the groove 24 in FIG. 4, a rectangular shape like the groove 23 in the modifications of FIGS. 5 and 8, or any other suitable shape. The grooves 23 and 24 further help to distribute the axial load of the clamp 10 on the disks D. The narrowed portion of the clamp defined between grooves 18 and 24 can also be referred to as a web 27, and the groove 23 can also be referred to as an annular undercut. A central portion of the clamp can be defined as the area radially inward from the web. A perimeter portion of the clamp can be defined as the area radially outward from the web.

The advantages of the invention disclosed herein are numerous. The relatively rigid central portion of the disk clamp ensures that the central portion will have a greater area to contact the hub, thus ensuring that there is minimal slippage or movement between the clamp and the hub. When the fasteners are tightened down to attach the disk clamp to the hub, the center portion of the disk clamp is able to deflect downward with minimal tilting or cantilevering which would otherwise reduce the contact area between the center portion and the hub. The web 27 defined between the opposing grooves 18 and 24 can be of varying thicknesses to control the amount of load transmitted radially from the fasteners to the perimeter portion of the disk clamp. The ability to vary the load transmitted from the fasteners allows one to minimize deflection known as disk coning and waviness. Because the contact surface of the disk clamp is flat rather than curved, undesirable excessive radial loading can be reduced which also minimizes undesirable disk deflection. Undesirable radial loading is further reduced by incorporation of grooves 23 and 24. Grooves 23 and 24 minimize the rotation on body 22 as the clamp is secured or clamped down. The larger contact area provided by the flat contact surface better compensates for locational misalignment between the clamp and disks which naturally occurs due to manufacturing tolerances in the manufacture of the clamp and of the disks. Particle generation resulting from movement of the contact area relative to the disk is also minimized thereby reducing contamination. The flat contact surface of the clamp remains in its contact position against a disk/spacer even during thermal cycles. Thus, there is no movement or displacement between the clamp contacting surface and the disk/spacer. A rounded disk contact surface may displace (e.g., curl/uncurl) in response to thermal cycles which contributes to undesirable particle generation caused by movement of the contact surface across the disk/spacer. Also, the countersunk portions of bores 16 allow the screw heads to come in full contact with the clamp and helps to prevent debris from escaping which is generated in the threading action.

While the above description and the drawings disclose and illustrate one embodiment and a number of modifications of that embodiment, one should understand that the invention is not specifically limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A clamp for securing one or more data storage disks to a hub of a disk drive, said clamp comprising:
   a flat body having top and bottom faces, a circumferential edge, and a center bore through which a portion of the hub extends;
   said body also defining in its bottom face a protuberance and a pair of grooves;
   said pair of grooves being spaced radially outward from said hub and spaced radially inward from said circumferential edge, and positioned on opposite radial sides of the protuberance;

said protuberance having a flat distal surface for engaging a data storage disk; and at least one securing bore formed in said body and radially spaced outward from said center bore.

2. The clamp of claim 1, wherein the protuberance is continuous and annular, and the pair of grooves are each continuous and annular.

3. The clamp of claim 2, wherein the protuberance has a generally trapezoidal shape in cross-section.

4. The clamp of claim 3, wherein the body is a circular, one-piece, integrally formed unit.

5. The clamp of claim 1, wherein the body further includes at least one force distributing groove formed in its top face, proximate the securing bore for distributing a securing force provided by a securing member that extends through the securing bore.

6. The clamp of claim 5, wherein the force distributing groove is arcuate shaped and lies radially outward from the securing bore.

7. The clamp of claim 1, wherein the body further defines at least one access bore for providing access to weights used to balance the weight of the clamp during rotation.

8. A clamp, as claimed in claim 1, wherein:

one groove of said pair of grooves extends to said bottom face, and another groove of said pair of grooves terminates at its lower end at a selected distance below said bottom face.

9. A clamp, as claimed in claim 1, wherein:

one groove of said pair of grooves has a trapezoidal shape.

10. A clamp, as claimed in claim 1, wherein:

one groove of said pair of grooves has an orthogonal shape.

11. A clamp, as claimed in claim 1, wherein:

one groove of said pair of grooves has a V-shape in cross-section.

12. A clamp for securing one or more data storage disks to a hub of a disk drive, said clamp comprising:

a flat body defining top and bottom faces, a center bore through which a portion of the hub extends, a plurality of securing bores spaced radially outward from said center bore for receiving securing members that clamp to the hub, at least one top groove spaced radially outward from said plurality of securing bores and formed in the top face proximate the securing bores for distributing a securing force provided by the securing members, and a bottom groove formed on said bottom face and spaced radially outward from the hub.

13. The clamp of claim 12, wherein the top groove is arcuate.

14. The clamp of claim 12, wherein the body further defines in its bottom face a protuberance and a pair of grooves positioned on opposite sides of the protuberance, said bottom groove being one of said pair of grooves; and said protuberance having a flat distal surface for engaging a data storage disk.

15. The clamp of claim 14, wherein the protuberance is continuous and annular, and the pair of grooves are each continuous and annular.

16. The clamp of claim 15, wherein the protuberance has a generally trapezoidal shape in cross-section.

17. The clamp of claim 16, wherein the body is a circular, one-piece, integrally formed unit.

18. The clamp of claim 12, wherein the body further defines at least one access bore providing access to weights used to balance the weight of the clamp during rotation.

19. The clamp of claim 18, wherein the centers of the at least one access bore and the securing bores lie generally on the same circumference.

20. A clamp, as claimed in claim 14, wherein:

one groove of said pair of grooves extends to said bottom face, and another groove of said pair of grooves terminates at its lower end at a selected distance below said bottom face.

21. A clamp, as claimed in claim 14, wherein:

one groove of said pair of grooves has a trapezoidal shape.

22. A clamp, as claimed in claim 14, wherein:

one groove of said pair of grooves has an orthogonal shape.

23. A clamp, as claimed in claim 14, wherein:

one groove of said pair of grooves has a V-shape in cross-section.

24. A clamp for securing one or more data storage disks to a hub of a disk drive, said clamp comprising:

a flat body defining top and bottom faces and a center bore through which a portion of the hub extends;

said body also defining in its bottom face a protuberance and a pair of grooves positioned on opposite radial sides of the protuberance and spaced radially outward from said center bore;

said protuberance having a flat distal surface for engaging a data storage disk;

said protuberance being a continuous, annular portion of the body and the pair of grooves being continuous and annular;

said body further defining at least one securing bore that extends through the body and spaced radially from the center bore; and said body defining at least one force distributing groove in its top face, proximate the securing bore for distributing the securing force provided by a securing member that extends through the securing bore.

25. A clamp, as claimed in claim 24, wherein:

one groove of said pair of grooves extends to said bottom face, and another groove of said pair of grooves terminates at its lower end at a selected distance below said bottom face.

26. A clamp, as claimed in claim 24, wherein:

one groove of said pair of grooves has a trapezoidal shape.

27. A clamp, as claimed in claim 24, wherein:

one groove of said pair of grooves has an orthogonal shape.

28. A clamp, as claimed in claim 24, wherein:

one groove of said pair of grooves has a V-shape in cross-section.

29. A clamp for securing one or more data storage disks to a hub of a disk drive, said clamp comprising:

a substantially planar body having top and bottom faces, and a central bore for receiving the hub, said body having
  (i) a circumferential protuberance formed on said bottom face, said protuberance having a flat surface for engaging a disk;
  (ii) at least one first circumferential groove formed on said bottom face and radially spaced outward from said protuberance; and
  (iii) at least one force distributing groove formed in said top face; and (iv) at least one securing bore spaced radially outward from said central bore.

30. A clamp, as claimed in claim 29, wherein:

said at least one first circumferential groove is a groove spaced radially outward from said protuberance.

31. A clamp, as claimed in claim 29, wherein:
said at least one circumferential groove is a groove spaced radially inward from said protuberance.

32. A clamp, as claimed in claim 29, wherein:
said at least one first circumferential groove includes a pair of grooves positioned on opposite radial sides of said protuberance.

33. A clamp, as claimed in claim 29, wherein:
said force distributing groove formed on said top face is spaced radially outward from said central bore.

34. A clamp, as claimed in claim 29, wherein:
said at least one first circumferential groove has a trapezoidal shape.

35. A clamp, as claimed in claim 29, wherein:
said at least one first circumferential groove has an orthogonal shape.

36. A clamp, as claimed in claim 29, wherein:
said at least one first circumferential groove has a V-shape in cross-section.

37. A clamp, as claimed in claim 32, wherein:
one groove of said pair of grooves extends to said bottom face, and another groove of said pair of grooves terminates at its lower end at a selected distance below said bottom face.

38. A clamp for securing one or more data storage disks to a hub of a disk drive, said clamp comprising:
an annular central portion including at least one securing bore formed through said central portion to secure said clamp to the hub;
a perimeter portion spaced radially outward from said central portion, said perimeter portion defining a peripheral edge of said clamp; and
a web interconnecting said central portion to said perimeter portion, said web having a thickness which is less than a thickness of said central portion, and less than a thickness of said perimeter portion, said web extending circumferentially around said central portion.

39. A clamp as claimed in claim 38, further including:
an undercut formed on said perimeter portion and lying radially outward from said web.

40. A clamp, as claimed in claim 39, wherein:
said undercut is V-shape in cross-section.

41. A clamp for securing one or more data storage disks to a hub of a disk drive, said clamp comprising:
a flat body having top and bottom faces and a center bore through which a portion of the hub extends;
said body also defining in its bottom face a protuberance and a pair of grooves positioned on opposite radial sides of the protuberance;
said protuberance having a flat distal surface for engaging a data storage disk;
the body further defining at least one securing bore that extends through the body and is spaced from the center bore;
the body further including at least one force distributing groove formed in its top face, proximate the securing bore for distributing the securing force provided by a securing member that extends through the securing bore; and
wherein the force distributing groove is arcuate shaped and lies radially outward from the securing bore.

42. A clamp for securing one or more data storage disks to a hub of a disk drive, said clamp comprising:
a flat body defining top and bottom faces, a center bore through which a portion of the hub extends, a plurality of securing bores for receiving members that secure the clamp to the hub, and at least one groove formed in the top face proximate the securing bores for distributing the securing force provided by the securing members; and
wherein the force distributing groove is arcuate and lies radially outward of the securing bores.

43. A clamp for securing one or more data storage disks to a hub of a disk drive, said clamp comprising:
a flat body defining top and bottom faces, a center bore through which a portion of the hub extends, a plurality of securing bores for receiving members that secure the clamp to the hub, and at least one groove formed in the top face proximate the securing bores for distributing the securing force provided by the securing members;
the body further defining at least one access bore providing access to weights used to balance the weight of the clamp during rotation; and
wherein the centers of the access bore and the securing bores lie generally on the same circumference.

44. A clamp for securing one or more data storage disks to a hub of a disk drive, said clamp comprising:
a flat body having top and bottom faces, a center bore through which a portion of the hub extends, and a plurality of securing bores spaced from the center bore;
said body also defining in its bottom face a protuberance and a pair of grooves positioned on opposite radial sides of the protuberance;
said protuberance having a flat distal surface for engaging a data storage disk;
the body further defining at least one access bore for providing access to weights used to balance the weight of the clamp during rotation; and
wherein the centers of the at least one access bore and the securing bores lie generally on the same circumference.

45. A clamp for securing one or more data storage disks to a hub of a disk drive, said clamp comprising:
a flat body having top and bottom faces and a center bore through which a portion of the hub extends;
said body also defining in its bottom face a protuberance and a pair of grooves positioned on opposite radial sides of the protuberance;
said protuberance having a flat distal surface for engaging a data storage disk; and
one groove of said pair of grooves extends to said bottom face, and another groove of said pair of grooves terminates at its lower end at a selected distance below said bottom face.

46. A clamp for securing one or more data storage disks to a hub of a disk drive, said clamp comprising:
a flat body defining top and bottom faces, a center bore through which a portion of the hub extends, a plurality of securing bores for receiving members that secure the clamp to the hub, and at least one groove formed in the top face proximate the securing bores for distributing the securing force provided by the securing members;
the body further defining in its bottom face a protuberance and a pair of grooves positioned on opposite sides of the protuberance;
said protuberance having a flat distal surface for engaging a data storage disk; and
one groove of said pair of grooves extends to said bottom face, and another groove of said pair of grooves terminates at its lower end at a selected distance below said bottom face.

47. A clamp for securing one or more data storage disks to a hub of a disk drive said clamp comprising:

- a flat body having top and bottom faces and a center bore through which a portion of the hub extends;
- said body also defining in its bottom face a protuberance and a pair of grooves positioned on opposite radial sides of the protuberance;
- said protuberance having a flat distal surface for engaging a data storage disk;
- said protuberance being a continuous, annular portion of the body and the pair of grooves being continuous and annular;
- said body further defining at least one securing bore that extends through the body and spaced radially from the center bore;
- said body defining at least one force distributing groove in its top face, proximate the securing bore for distributing the securing force provided by a securing member that extends through the securing bore; and
- one groove of said pair of grooves extending to said bottom face, and another groove of said pair of grooves terminating at its lower end at a selected distance below said bottom face.

48. A clamp for securing one or more data storage disks to a hub of a disk drive, said clamp comprising:

- a substantially planar body having top and bottom faces and a central bore for receiving the hub, said body having a circumferential protuberance formed on said bottom face, said protuberance having a flat surface for engaging a disk, and said body further having at least one first circumferential groove formed on said bottom face and communicating with said protuberance;
- said at least one first circumferential groove includes a pair of grooves positioned on opposite radial sides of said protuberance; and
- one groove of said pair of grooves extends to said bottom face, and another groove of said pair of grooves terminates at its lower end at a selected distance below said bottom face.

\* \* \* \* \*